United States Patent [19]
Griner et al.

[11] 4,176,509
[45] Dec. 4, 1979

[54] LATERALLY ADJUSTABLE TOBACCO COMBINE

[75] Inventors: Henry Griner; Wade Griner; Claude Hyars; Tommy Sweat, all of Patterson, Ga.

[73] Assignee: G S & H Equipment Corporation, Patterson, Ga.

[21] Appl. No.: 816,120

[22] Filed: Jul. 15, 1977

Related U.S. Application Data

[63] Continuation-in-part of Ser. No. 503,676, Sep. 6, 1974, Pat. No. 4,035,998.

[51] Int. Cl.² ............................................. A01D 45/16
[52] U.S. Cl. .......................................... 56/27.5; 56/330
[58] Field of Search .............. 56/27.5, 330, 30, 33–35, 56/16.4

[56] References Cited
U.S. PATENT DOCUMENTS 3,889,454  6/1975  Bruel .................................... 56/330
3,962,850  6/1976  Moore .................................. 56/27.5

Primary Examiner—Russell R. Kinsey
Attorney, Agent, or Firm—Jim Zegeer

[57] ABSTRACT

In accordance with the present invention, a lateral beam frame assembly which is mounted on a mobile unit frame, and supports a vertically adjustable guide beams which in turn support a contra-rotating tobacco defoliating mechanism as well as the conveyor assembly for conveying a defoliated tobacco leaves to a common conveyor, is made laterally adjustable. The longitudinal beams are supported adjustably on the upper portions of the tractor mounting framework. A cable and winch arrangement is used for securing lateral adjustment of the beam and the rigidly mounted guide elements for supporting the vertical guide beams. In addition, an upper truss-forming cable or bar assembly is secured to the lateral beam so as to rigidify same and prevent bending moments from impairing the effective operation of the combine and harvester.

9 Claims, 3 Drawing Figures

LATERALLY ADJUSTABLE TOBACCO COMBINE

The present invention is a continuation-in-part of our application Ser. No. 503,676 entitled "Harvesting and Combining Tobacco", filed Sept. 6, 1974, now U.S. Pat. No. 4,035,998 and incorporated herein by reference in its entirety.

BRIEF DESCRIPTION OF THE INVENTION

In our above-identified patent application, the defoliators were mounted a spaced distance from the tractor mounting assembly so that the tobacco farmer may have to alter his planting operations in order to fully utilize the invention there disclosed. The capability of the original invention to combine tobacco without significantly altering current tobacco practices is utilized in many geographical areas of the tobacco growing belt. Generally, tobacco is planted in series of four rows at a time, two spaces being skipped and then the planting is resumed, on this four "in" and two "out" basis. The present invention permits this traditional planting procedure to be continued and, at the same time, provides complete flexibility to the combining machine per se without in any way significantly altering the basic operation of the machine as disclosed in our U.S. Pat. No. 4,035,998 nor in any way impeding the speed of that machine. The present invention permits the tobacco farmer to contunue his traditional practice of planting in the above-identified pattern and at the same time it permits accessibility to all tobacco plants because now the combine can traverse a path adjacent to each row and harvest the tobacco leaves mounted on the plants in those rows and then, by a simple adjustment on the machine, adjust the lateral position of the combining devices per se relative to the tractor so as to permit it to reach adjacent rows further spaced from the tractor itself or closer spaced as may be desired.

In accordance with the present invention, the frame assembly constituted by the main lateral or transverse suspension beams are adjustably secured by roller bearing assemblies on the upper surfaces or edges of the longitudinal beams which run above and longitudinal of the tractor's direction of travel. Thus, both the vertical adjustment of the defoliators per se as well as their lateral adjustment relative to the longitudinal path of the tractor is provided in accordance with the present invention. With this improvement, the farmer can now effectively harvest and combine tobacco leaves growing on tobacco stalks planted in accordance with contemporary planting procedures. The only modifications are the lengthening of the lateral beams, and mounting of same for lateral adjustment along with the cable and winch mechanism for securing the adjustment. Morever, in order to provide a strengthening of the lengthened lateral beams, a truss-forming cable is secured to the lateral ends of the beams and a vertical strut is provided proximate the center thereof.

BRIEF DESCRIPTION OF THE DRAWINGS

The above and other objects, advantages and features of the invention will become more apparent when considered in conjunction with the accompanying drawings wherein.

DETAILED DESCRIPTION OF THE INVENTION

Figure 1:
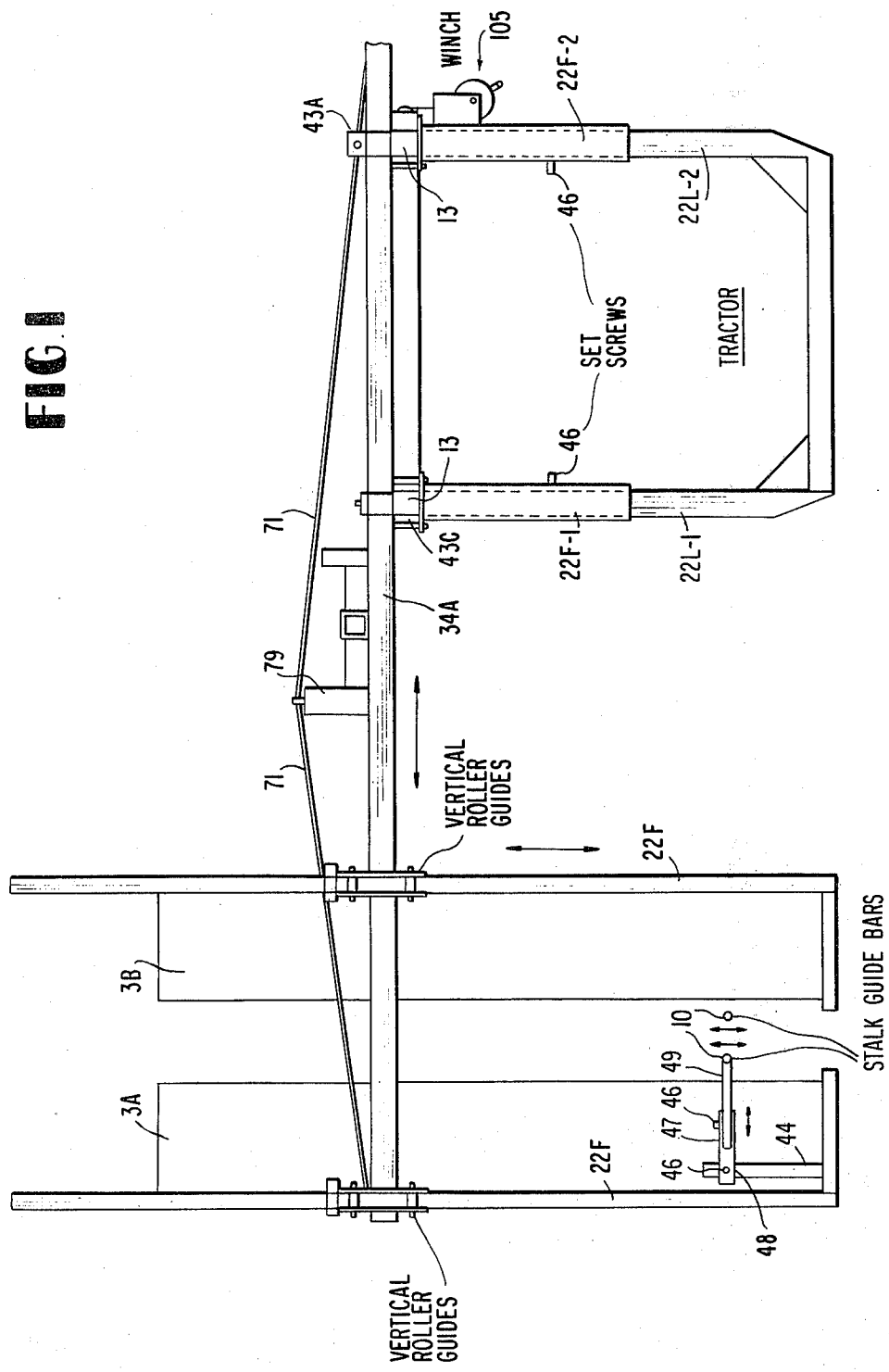
FIG. 1 is a front elevational view of a portion of the assembly disclosed in our U.S. Pat. No. 4,035,998, showing the present invention incorporated therein.
Figure 2:
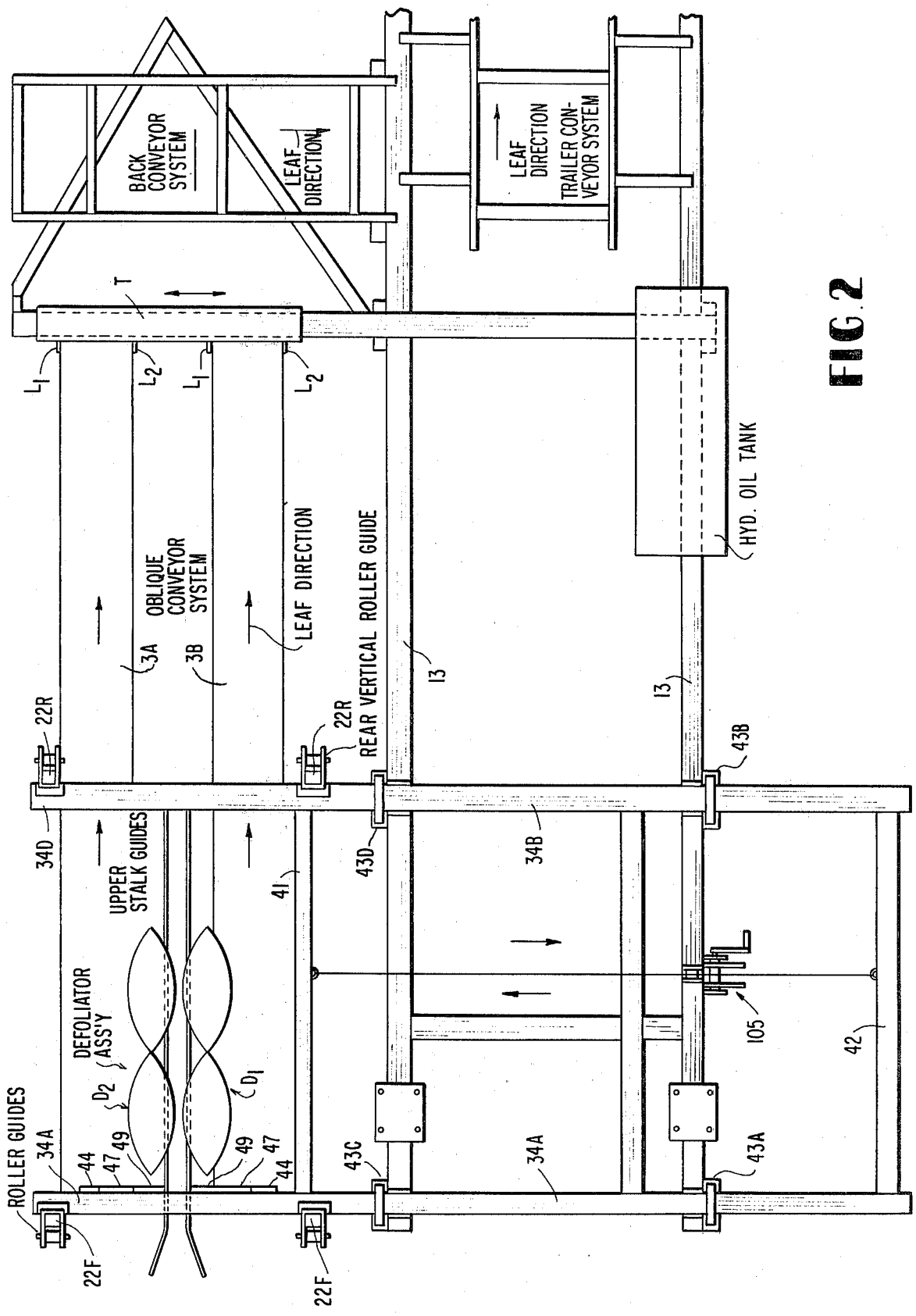
FIG. 2 is a top plan view of a tobacco combine incorporating the invention.
Figure 3:
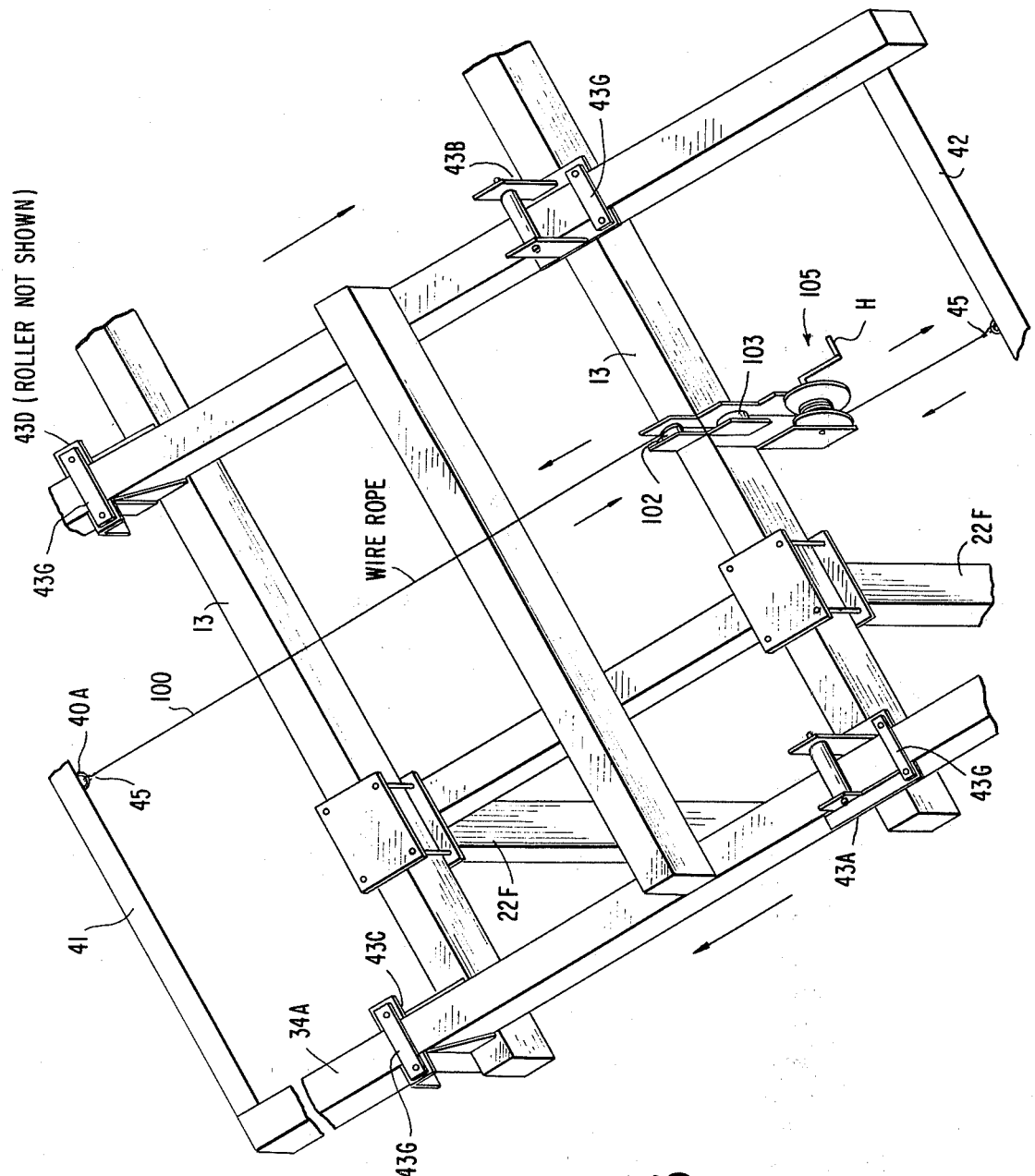
FIG. 3 is an enlarged isometric view showing the general mounting arrangement of the lateral beams on the longitudinal beams for adjustment purposes.

In our U.S. Pat. No. 4,035,998, we disclosed a tobacco combine which is adaptable for mounting on any tractor currently marketed in the United States, thus enhancing the availability to all tobacco growers of the usefulness of mechanized harvesting of tobacco and it was particularly useful for tobacco farmers who have utilized tractors in their farming operations.

The present improvement provides an adjustable mounting assembly for the lateral beams which means makes the tobacco combine adaptable for mounting on any tractor to harvest the conventional four "in" and two "out" planting.

In addition, the longitudinal stalk guides are adjustable laterally and vertically so as to provide additional means to differentiate between leaves which are ready for defoliation and those leaves which are not ready for defoliation (e.g., not-to-be-defoliated leaves).

There can be space for an additional conveyor means (not shown) whereby leaves may be deposited directly into specially designed metal containers (of various sizes) mounted on a fork lift at the rear of said tractor. Such containers fit into new curing barns which are self contained units built somewhat like a house trailer which scientifically control the curing of the tobacco leaves stored therein (i.e., automatic temperature and humidity control).

The lateral shifting of the defoliators requires a corresponding shifting of oblique conveyor assemblies to shift inward and outward at the same rate that the defoliation frame assembly is shifting inward or outward, and a sliding support is provided for this purpose.

As noted above, additional cantilever or lateral beam rigidification support means is provided by welding rod brace wire support located superior to said defoliation frame assembly to provide structural support and integrity for the elongated main lateral support beams and associated structure.

As noted above, the original invention disclosed in our U.S. Pat. No. 4,035,998 required that the tobacco grower plant two rows of tobacco and skip two rows of tobacco. The purpose being that said tobacco combine could traverse a field of tobacco adjacent to a row of tobacco plants in the space where the two rows of tobacco plants were not planted and harvest those leaves which were hanging from said adjacent stalks. The procedure followed was for said implement mounted tractor, at the end of said row of tobacco plants, to make a 180 degree turn to the right and begin engaging those tobacco leaves on its right which are located on the row of tobacco plants planted adjacent to the first row of said tobacco plants which have already been the object of defoliation. This requires the requisite two rows planted and two rows not planted arrangement, which is not utilized per se in all sections of the tobacco growing belt which extends from Florida to Maryland. The alternate method utilized within this geographical area is the four row planted and two row not planted configuration with varying distances in between rows. This procedure limited the use of the invention to certain qualified planting procedures. The present invention extends the versatility of the invention in our U.S. Pat. No. 4,035,998 in those other areas where the alternate planting procedures are utilized at low cost, without sacrifice of speed and efficiency.

Four rows of tobacco plants are planted on centers of 40 inches to 48 inches, that is to say, planted 40 to 48 inches apart laterally. The present invention provides a means whereby the harvesting of the two inner rows may be encompassed by said means in a satisfactory manner, said means operating with the same efficiency utilized in the original invention.

Elongated main lateral suspension beams 34A, 34B are joined by welding to braces 41 and 42. In this embodiment, the elongation is sufficiently long to allow an extension of said main lateral suspension beams 34A, 34B to provide a lineal distance of 102 inches between the center line of the tractor and the center line of the horizontal distance between the two axes of the two defoliators, $D_1$-$D_2$. It is to be understood that greater extensions can easily be accommodated, if desired.

In two roller bearing assemblies 43A and 43B are welded in an upright position to the upper or top surface of the longitudinal main support beam 13, one at the junction of the anterior or forward most main lateral suspension beam 34B, and one at the junction of the middle main lateral suspension beam 34. The other two roller bearings 43C and 43D are welded in an inverted position to the superior surface of the inner or right main longitudinal support beam 13 at the juncture of the anterior main lateral suspension beam 34 and the remaining one at the juncture of the middle main lateral suspension beam 34B. Said roller bearing assemblies are equipped with clamps 43G. Each clamp has two bolts, each to provide a means to adjustably secure said main lateral suspension beams 34A, 34B to the longitudinal support beams. A taut cable 100, secured to cross-beam 41, runs over idler 102 and under roller 103 and is wound about the drum of winch 105, and then extends to a securement point on cross-piece 42. The tautness is maintained by turnbuckles or springs not shown—so that rotation of the winch drum by its handle H shifts the position of the frame. The operator, by loosening or releasing the tension exerted by said clamps 43G upon the superior surface of main lateral suspension beams 34A, 34B, and by manual power means is able to provide means for shifting the main lateral suspension beams 34A, 34B from which is suspended the entire defoliating frame assembly resting on said roller bearing assemblies 43, laterally to any desired position, to thus suspend said defoliating frame assembly and the defoliators astride said interior row of tobacco plants.

To insure structural integrity of the of the various members of the defoliation frame assemblies with specific reference to the downward bending moments applied to both ends of main lateral suspension beams 34A, 34B, a truss arrangement has been incorporated by installing a ½ inch support rod 71 on to main lateral suspension beam 34B, which is attached to both ends of said main lateral suspension beam 34B and supported in the center by a vertically protruding I-beam 79 to create anti-bending moments at said ends.

As an alternative to the taut cable described above, the cable may be provided with a hook 40A which is inserted by the operator into metal ring 45 mounted on the inner side of longitudinal brace 41. The operator then manually cranks winch 39 in a clockwise direction causing cable 40, which now has one end secured to the winch drum, to be reeled onto said winch thereby laterally moving the defoliation frame assembly through the roller bearing assemblies 43 so that said assembly will stradle the inner rows of tobacco plants herein described and their defoliation effected. As the main lateral suspension beams 34A, 34B are elevated there beneath the outer row of tobacco plants pass undisturbed, as said main lateral suspension beams are directly attached at the same level and are directly suspended from the longitudinal main support beams 13 and consequently are at the same height above ground level as said combine traverses said tobacco field. To return the defoliation frame assembly to its original position, a longitudinal brace 42 is provided with metal ring 45 on its interior surface. The operator disconnects cable 40 and hook 40A and inserts said cable and hook 40A into metal ring 45. The operator then by reversing direction of winch operation counter clockwise moves the defoliation frame assembly to its original position for exterior row defoliation. The clamps 43G are loosened and tightened for each such adjustment. It will be appreciated that an entire field may have certain rows defoliated and the shifting then performed to defoliate the remaining rows, or only portions of a field defoliated and the shifting performed. Manifestly, the shifting may, if desired, be done by a hydraulic or other form of power means.

Contemporaneous with the extension of said defoliation frame assembly there is an equal amount of lateral shifting of the oblique conveyor assembly 3A, 3B in the same direction of travel as the defoliator frame assemblies to accommodate and transport the tobacco leaves which have been the object of defoliation upward and rearward. Said leaves are then deposited on to an elongated transversely disposed conveyor (element 6 of our above U.S. Pat. No. 4,035,998) which has been elongated so as to be adaptive to receive defoliated leaves from said shifting oblique conveyor assembly means in whatever position said oblique conveyor assemblies may be positioned. Said lateral shifting is accomplished with the shifting of the defoliation frame assembly but as the defoliator frame assembly and oblique conveyor assemblies 3A, and 3B are integrally connected by construction of hinge pins which allow vertical angular adjustment only between said oblique conveyor assemblies 3A, 3B, they do not permit horizontal angular movement and said hinge pins thus provide horizontal rigidity so that the winch operation thus moves both units, the defoliation frame assembly and oblique conveyor assemblies 3A, 3B simultaneously. The upper portions of conveyor assemblies 3A, 3B are mounted on a 3½ inch square tubing "T" which slidingly fits over the 3 inch main lateral suspension beam 34C, thus allowing free movement of this outer tubing over the main lateral suspension beam 34C. Oblique conveyor locating lugs $L_1$-$L_2$ are welded on tube "T" and engage the oblique conveyor sides for positioning and adjustment.

By shortening the two front main vertical support beams 22F-1 and 22F-2 which are hollow and inserting therein lower front main vertical support beams 22L-1 and 22L-2 which have a smaller cross-sectional diameter than the front main support beams thus allowing movememnt one inside the other or adjustability up or down inside said front vertical main support beam 22F-1 and 22F-2. Said front vertical main support beams are provided with set screws 46 whereby the operator may adjust the relative position of the front main vertical support beams 22F-1 and 22F-2 and lower front main vertical support beams 22L-1 and 22L-2 with respect to each other so that the entire frame assembly will be horizontally aligned on said tractor on which it is to be affixed and said set screws 46 will enter one of several holes (not shown) provided for in the exterior surface of lower front vertical main support beams for the purporse of providing rigidity and stability to the affixation of said lower front vertical main support beams 22L-1 and 22L-2 to said front vertical main support beams 22. This adjustability is helpful due to uneven vertical heights from ground level to upper surface of rear axles of various tractor designs and consequent uneven distances of ground level to height of front attachment plate mountings on each tractor, thereby creating an indefinite amount of relative vertical distances between said front attachment plates and rear axes of various tractor makes and models, which produced uneven alignment when the implement was mounted on certain tractor models.

ADJUSTABLE UPPER GUIDES

In accordance with the invention, the upper stalk guides 10 are adjustable. It was found in successive runs which are required to completely defoliate the tobacco plant to accomplish the harvesting process that the stabilizing forces provided by said upper stalk guides 10 need to be altered in an upward direction as well as in a lateral direction to thus better stabilize the upper portion of said tobacco stalk during the latter stages of the defoliation process, as the upper portion of said stalk is considerably thinner than the bottom portion. Adjustability of the guide is accomplished by the introduction of an elongated plate 44 (one for each guide) which is permanently affixed to a point adjacent the bases of the front suspension guides 21F on which are mounted movable sleeves 48 into which there are inserted set screws 46. Said sleeves 48 can be adjusted upward or downward at the discretion of the operator to assure maximum effective stability during the defoliation of the tobacco plant. On said sleeves 48 there are welded hollow horizontal tubes 47 extending in a lateral direction into which are inserted tubes 49 having a smaller outside diameter than the inside diameter of the tubes 47 thereby making the smaller tubes 49 freely movable inside the larger tubes 47. Said larger hollow tubes 47 are equipped with set screws 46 so that the smaller tubes 49 onto which the upper stalk guides are welded can be positioned at appropriate distances from said stalk at the option of the operator to achieve maximum efficiency and stability to the tobacco plant during the defoliation process.

Hydraulic fluid reservoir 8 has been relocated superior to left longitudinal main support beam 13 to provide additional counter balance to the moment produced by the shifting oblique conveyor assemblies 3A, and 3B.

In addition, the loading platforms have been completely deleted which were part of the original application herein. In lieu thereof, lateral conveyor assembly has been elongated to accommodate the shifting oblique conveyor assemblies 3A, 3B, when defoliation frame assembly and oblique conveyor assembly 3A, 3B are in an extended row or adjacent row configuration. A trailer conveyor assembly (not shown) has been installed in lieu of said loading platforms, tables and other work areas associated therewith. This longitudinal conveyor assembly is installed adjacent to the point of discharge on lateral conveyor assembly and harvested leaves are deposited onto said longitudinal conveyor assembly from lateral conveyor assembly 6 and transported thereon posteriorly. Technological advances made in the curing of tobacco provide automatic curing barns which cure tobacco by utilization of metal curing containers which evenly distribute heat throughout the contents therein, i.e., tobacco leaves. It is no longer necessary to provide such facilities as clamps, storage racks, etc. In lieu thereof, a fork lift device has been mounted onto the 3 point hitch device located at the rear of various tractor models to accommodate above said metal curing container. Said defoliated tobaccco leaves transported on longitudinal trailer conveyor assembly are deposited into said metal curing container until it is filled up, at which time the tractor via adjustable fork lift places said metal curing container onto a farm trailer and an empty one is replaced thereon for continued operation. Said longitudinal conveyor assembly is available in various lengths.

It will be appreciated that during adverse atmospheric conditions where wind forces could disperse and scatter free falling defoliated tobacco leaves, wind guards may be placed to each edge of the oblique conveyor assemblies and plastic shields over the upper ends of the oblique conveyors may be provided to insure proper travel of the defoliated tobacco leaves.

What is claimed is:

1. In a tobacco combine having a first frame assembly on a mobile unit, a second frame assembly mounted on said first frame assembly and extending transversely to the intended direction of forward travel of said mobile unit, said second frame assembly having portions extending above the ground to each side of said mobile unit in cantelever fashion and a tobacco leaf defoliator frame assembly mounted for vertical adjustment on said second frame assembly and to one side of said mobile unit, and a defoliation unit on said tobacco leaf defoliation frame assembly, the improvement comprising:
   means releasably mounting said second frame assembly on said first frame assembly to permit adjustment of said second frame assembly relative to said direction of travel, and independently of the vertical adjustment of said tobacco leaf defoliator frame assembly,
   power means between said first and said second frame assemblies for effecting said lateral movements of said second frame assembly relative to said direction of travel, and
   clamp means for clamping said second frame assembly to said first frame assembly after said lateral adjustment thereof.

2. The invention defined in claim 1 including clamp means for clamping said second frame assembly to said first frame assembly after lateral adjustment thereof.

3. The invention defined in claim 1 said combine including at least oblique conveyor means aligned with said defoliator assembly for conveying defoliated leaves in a rearward and upward direction, the further improvement comprising a slidable member resting in slidable relation on a portion of said first frame assembly, and means on said slidable member for receiving said oblique conveyor and moving said slidable member with the extension and retraction movements of said second frame member, to thereby maintain alignment of said oblique conveyor with said tobacco leaf defoliator assembly.

4. The invention defined in claim 1 wherein said second frame assembly includes at least a pair of transverse steel beams, and roller means mounting said transverse steel beams on the said first frame assembly in cantelever fashion, and
  power means between said first and said second frame assemblies for effecting said extension and retraction movements.

5. The invention defined in claim 4 wherein said power means is a cable and winch assembly.

6. The invention defined in claim 1 including a cable secured at its ends to proximate the ends of said second frame assembly, and a vertical strut between said second frame assembly and about the medial portion of said cable to form a rigidifying truss.

7. The invention defined in claim 1 wherein said first frame assembly includes telescoping vertical beam members whereby the vertical height of said second frame assembly can be adjusted.

8. The invention defined in claim 7 wherein said defoliator assembly includes at least an upper stalk guide, the further improvement comprising means for adjusting the vertical height of said upper stalk guide bar relative to said tobacco lead defoliator frame assembly.

9. The invention defined in claim 3 including means on said first frame assembly for receiving a trailer conveyor.

* * * * *